United States Patent [19]
Nelson

[11] Patent Number: 6,029,352
[45] Date of Patent: Feb. 29, 2000

[54] WING PANEL ASSEMBLY

[75] Inventor: Paul E. Nelson, University Place, Wash.

[73] Assignee: The Boeing Company, Seattle, Wash.

[21] Appl. No.: 08/937,486

[22] Filed: Sep. 25, 1997

[51] Int. Cl.⁷ ..................................................... B23P 15/00
[52] U.S. Cl. ............................ 29/897.2; 29/429; 29/722; 414/589
[58] Field of Search ................................. 29/897.2, 429, 29/431, 722, 720, 721, 34 B, 243.53, 227.51, 33 R; 414/589, 590

[56] References Cited

U.S. PATENT DOCUMENTS

| | | | |
|---|---|---|---|
| 4,203,204 | 5/1980 | Murphy ....................................... | 29/703 |
| 4,590,578 | 5/1986 | Barto, Jr. et al. . | |
| 4,864,702 | 9/1989 | Speller, Sr. et al. ..................... | 29/34 B |
| 4,885,836 | 12/1989 | Bonomi et al. .......................... | 29/524.1 |
| 4,894,903 | 1/1990 | Woods ....................................... | 29/448 |
| 4,967,947 | 11/1990 | Sarh .......................................... | 227/52 |
| 4,995,146 | 2/1991 | Woods ....................................... | 29/281.3 |
| 5,033,014 | 7/1991 | Carver et al. ....................... | 364/571.03 |
| 5,033,174 | 7/1991 | Zieve . | |
| 5,046,688 | 9/1991 | Woods . | |
| 5,249,785 | 10/1993 | Nelson et al. . | |
| 5,341,556 | 8/1994 | Shubin et al. ............................ | 29/448 |
| 5,615,474 | 4/1997 | Kellner et al. . | |
| 5,848,458 | 12/1998 | Bullen ....................................... | 29/33 K |
| 5,896,637 | 4/1999 | Sarh ......................................... | 29/34 B |

*Primary Examiner*—David P. Bryant
*Assistant Examiner*—Marc W. Butler
*Attorney, Agent, or Firm*—J. Michael Neary

[57] ABSTRACT

A process and apparatus for fabricating wing panels from a plurality of elongated wing planks attached together with splice stringers along adjacent longitudinal edges and stiffened with stringers parallel to each other and to the splice stringers includes a fixture having a series of headers on which the planks can be assembled and held at the desired curvature with attachment devices for holding the planks as assembled on the fixture. An elevator supports the fixture in an elongated pit for precise adjustment in a generally vertical direction of the fixture and the assembled wing planks. A stringer positioning device is mounted along one longitudinal edge of the pit for positioning a stringer loaded thereon against the assembled wing planks accurately in accordance with the wing design. A downwardly opening yoke having two arms depending from a top cross member is suspended over the pit on a support structure. Tools are mounted on opposite arms of the yoke for performing clamp-up, drilling and fastener installation functions to fasten the stringers to the assembled wing panel planks on the fixture. A saddle mechanism is mounted on rails running longitudinally of the pit for moving the support structure longitudinally of the pit to position the yoke and the tools mounted thereon sequentially at fastener positions spaced along the stringer. A control system generates signals to an actuator for moving the elevator in a generally vertical direction to position the assembled wing panel planks at an elevation corresponding to a next stringer to be attached to the wing planks, and also controls operation of the support structure saddle and the tools on the yoke. The invention can also be used to fabricate individual planks from wing plate and stringers for assembly into complete wing panels on another apparatus.

20 Claims, 6 Drawing Sheets

WING PANEL ASSEMBLY

This invention relates to assembly of airplane wing panels, and more particularly to a method and apparatus for assembling airplane wing panels with great accuracy and efficient use of factory floor space.

BACKGROUND OF THE DISCLOSURE

Wing panels for commercial jet transport airplanes are typically built up from long aluminum "planks" connected together along longitudinal adjacent edges with splice stringers and stiffened with parallel stringers extending longitudinally of the wing. Empannage horizontal stabilizer panels are also stiffened with stringers. The stringers are spaced approximately 6"–8" apart chord-wise over the entire surface of the wing panel and are fastener to the wing planks by rivets or other fasteners approximately every 1"–2" along the length of the stringers. A typical commercial jet transport of about 300 seat capacity will have about 300,000 rivets fastening the stringers and splice stringers to the wing planks to make up each of the upper and lower wing panels, so it is imperative for an efficient wing fabrication facility to high speed accurate equipment for drilling and fastener installation with a minimum of manually installed fasteners and rework.

In the classical wing panel fabrication process, the wing planks are fixtured in position and are temporarily fastened together with stringers and tack fasteners on an apparatus similar to that shown in U.S. Pat. No. 4,894,903 to Woods. Tack fasteners are placed about every 20" to hold the wing panel planks together securely enough to move them to a riveting machine where the tacked-together wing panel is laid on horizontal headers which support it at the desired compound curvature for drilling and rivet installation to permanently fasten the stringers to the wing planks. Afterward, the temporary tack fasteners are removed and replaced with permanent fasteners.

This classical process is very wasteful of factory floor space since the wing panel is supported in a stationary horizontal position during riveting. It also requires large and expensive equipment to perform the riveting, since the drilling and riveting machine must be capable of precise movements in five axes over the entire length and width of the wing. The panel fixturing and temporary fastening are typically performed on a panel jig having hard tooling to locate the stringers and planks. Panel jigs are expensive tools and are each dedicated to only a single airplane model. The operations on the panel jig are performed in the vertical orientation, but the assembled wing panel must then be "flown" to the wing riveting machine and accurately indexed thereon, which requires large and expensive crane equipment and takes an entire shift to accomplish the transfer, during which both the fixturing jig and the wing riveter are out of production. During indexing of the assembled wing panel on the headers of the wing riveter, the expensive wing riveter is sitting idle. Thus, the existing is labor intensive, slow, and requires an inefficient use of expensive factory floor space and equipment.

Several attempts have been made in the past to provide apparatus that is capable of riveting stringers to wing panels in a vertical orientation. U.S. Pat. No. 4,864,702 to Speller, Sr. et al. and U.S. Pat. No. 5,033,174 to Zieve disclose apparatus for holding the wing panel in a stationary vertical position while a gantry or yoke moves along the wing and moves tools vertically or chord-wise to perform operations on the wing panel. These devices accomplish the desirable saving of factory floor space but require a complicated and expensive mechanism for vertically moving the tooling to position it at the desired rivet installation height chord-wise of the wing panel. The modern requirements for extreme positioning precision of the stringers and ability to record statistical data regarding hole parameters increases the cost involved in adding the vertical movement capability into the moving gantry or yoke.

SUMMARY OF THE INVENTION

Accordingly, it is an object of this invention to provide a method and apparatus for fixturing wing planks and fastening stringers to the wing planks using a wing fixture that is vertically adjustable, thereby making possible the use of a relatively simple and inexpensive machine tool for drilling, hole conditioning and fastener installation having only limited or no vertical travel capability. Another object of this invention is to provide a method and apparatus for fixturing wing planks and fastening stringers to the wing planks wherein the stringers being fastened to the wing plank assembly are always at a conveniently accessible height for the workers to position additional stringers and to service the hole drilling and fastener installation tooling. Still another object of this invention is to provide an apparatus on which other panels with different contour can be fabricated with a quick and effortless changeover for improved cell efficiency.

These and other objects of the invention are attained in a method and apparatus for fabricating wing panels for airplane wings at a desired curvature. The wing panels are made up of a plurality of elongated wing planks attached together with splice stringers along adjacent longitudinal edges and stiffened with stiffening stringers parallel to each other and to the splice stringers. A fixture for holding the planks in the proper position relative to each other and at the desired curvature is supported in an elongated pit. The fixture has a number of headers, one each spaced lengthwise along the length of the pit at about the spacing of wing ribs in the wing when it is finally assembled. An elevator supports the fixture in the pit for precise adjustment of the fixture and the assembled wing planks in a generally vertical direction. A stringer positioning device is mounted alongside one longitudinal edge of the pit for positioning a stringer loaded thereon against the assembled wing planks accurately in accordance with the wing design. A downwardly opening yoke having two arms depending from a top member is suspended over the pit on a support structure, such as a gantry spanning the pit, or a traveling support tower on one side of the pit. The support structure is supported for longitudinal motion lengthwise of the pit on a saddle mechanism for moving the support structure longitudinally of said pit, thereby to position the yoke and the tools mounted thereon sequentially at fastener positions spaced along the stringer. Each header may be released individually from the panel and retracted away from the panel and into the pit to allow the fastening yoke to access the fastener locations covered by that header. Tools mounted on opposite arms of the yoke performing clamp-up, drilling and fastener installation functions to fasten the stringer to the assembled wing panel planks on the fixture.

DESCRIPTION OF THE DRAWINGS

The invention and its many attendant objects and advantages will become more clear upon reading the following description of the preferred embodiments in conjunction with the following drawings, wherein.

DESCRIPTION OF THE PREFERRED EMBODIMENTS

Figure 1:
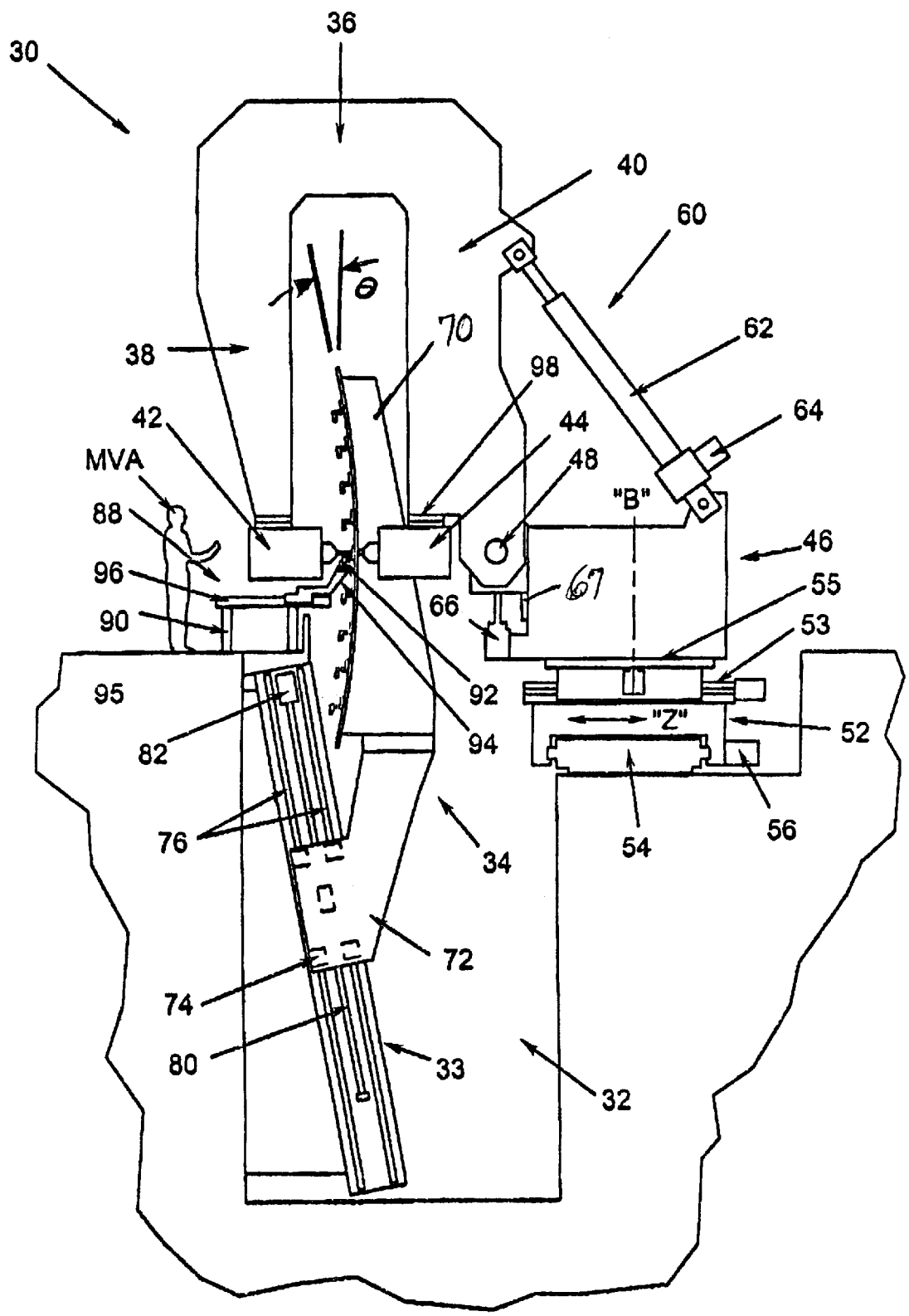
FIG. 1 is a sectional elevation of a first embodiment of an apparatus for practicing the method of this invention, showing a representative wing panel supported on one of a multitude of headers of a fixture, and being operated upon by drilling and fastener installation tooling supported on the depending arms of a yoke which is supported from one side of a the pit in which the fixture is mounted for generally vertical motion.

Turning now to the drawings, wherein like reference numerals designate identical or corresponding elements, and more particularly to FIG. 1 thereof, a yoke assembly is shown having a 30 and associated supporting and motive structures for suspending the yoke 30 over an elongated pit 32 containing an elevator 33 for supporting a fixture 34 on which elements of a wing panel are held for drilling, hole conditioning and fastener insertion. The yoke 30 has a top cross member 36 and two depending arms 38 and 40, at the bottom ends of which are mounted opposed sets of tools 42 and 44 for hole drilling and fastener installation.

The yoke assembly includes a support structure 46 to which the yoke 30 is attached by way of a pivot pin 48 extending through a pair of parallel knuckles 50 at the lower end of the arm 40. The pivot pin 48 enables the yoke 30 to pivot about an "A" axis parallel to an "X" axis in the longitudinal direction of the pit 32. Pivoting of the yoke 30 about the "A" axis makes it possible to easily and accurately normalize the tools 42 and 44 to the curved surface of the planks of the wing panel P at the point of drilling and fastener installation.

The support structure 46 is mounted for rotation about a vertical axis "B" on a saddle mechanism 52. Airplane wing panels are curved in the span-wise direction as well as the chord-wise direction, and rotation of the support structure 46 about the "B" axis enables the yoke 30 to rotate to a vertical plane that is normal to the wing panel at the point of fastener installation. Rotation of the support structure 46 on the saddle mechanism 52 is effected by a bevel gear on the support structure 46, driven by a servo motor and engaged with a ring gear 55 on the saddle mechanism 52. Operating the servomotor in one direction or the other drives the bevel gear and rotates the support structure 46 about the ring gear 55 on the saddle mechanism in one direction or the other to rotate the support structure 46 to the desired vertical plane normal to the wing panel at the desired point of fastener installation. Thus, rotation of the yoke 30 about the "A" axis through the pivot pin 48 and rotation about the "B" axis enables the yoke to be positioned so that the tools 42 and 44 are normal to the plane of the wing panel at any desired point of fastener installation.

Linear motion of the support structure 46 in the "X" direction, that is, horizontally and perpendicular to the "X" direction, is provided by a linear slide 53 by which the support structure 46 is mounted on the saddle 52. Motion in the "Z" direction enables the yoke to be translated horizontally in the direction transverse of the wing panel to account for both spanwise and chordwise curvature of the wing panel.

The saddle mechanism 52 on which the support structure 46 is mounted is in turn mounted for linear motion in the "X" direction on tracks 54 extending alongside one longitudinal edge of the pit 32. A conventional drive mechanism 56 drives the saddle mechanism 52 along the tracks 54 to position the yoke 30 at any desired position lengthwise of the wing panel, and a scale is attached to the edge of the track for reading by a pickup on the saddle 52 for positional feedback to a control system, described below. Examples of such drive mechanisms abound in the machine tool art and include gear drives along the edge of the track as in U.S. Pat. No. 5,565,242 entitled "Lubrication Applicator" by Buttrick et al. and in U.S. Pat. No. 5,477,595 entitled "Stringer/Clip Placement and Drilling" by Peter McCowin, the disclosures of which are incorporated herein by reference. Other such conventional drive mechanisms could also be used to drive the saddle mechanism 52 along the track 54.

The tilt angle of the yoke 30 about the "A" axis, coincident with the axis of the pivot pin 48, is controlled by a tilt angle control mechanism 60, including a ball screw in a sleeve 62 driven by a servo motor 64. This adjustment makes possible the tilting of the yoke 30 in its vertical plane to normalize the line of action of the tools on the two arms 38 and 40 of the yoke 30 with the curve of the wing panel at the height of fastener installation. A jack 66 between the support structure 46 and the yoke arm 40 provides the capability for adjustment of the yoke in the direction of the "Y" axis on linear bearings 67 to provide compensation for vertical displacement caused by rotation of the yoke 30 around the "A" axis and to provide compensation for possible vertical inaccuracies in the "X" axis tracks 54.

The fixture 34 includes a series of headers 70 spaced about two feet apart longitudinally of the pit. Each header 70 has a curved edge corresponding to the desired outer mold line of the wing panel P at the position of the header on the fixture 34. The headers have attachment devices for releasably holding the wing panel planks against the headers. The attachment devices include suction cups mounted in a channel between two spaced plates of the header which pull the panel against solid reference surfaces if the header, like the headers shown in FIG. 4 of U.S. Provisional Application Ser. No. 60/013,986 by Munk, Strand and Nelson entitled "Determinant Wing Assembly" filed on March 22, 1996, the disclosure of which is incorporated by reference herein.

The vertical position of the headers 70 and the wing panel mounted thereon is controlled by the elevator 33 mounted in the pit 32. The elevator 33 includes a series of carriers 72 on which the fixture 34 is mounted. The carriers 72 each have a series of linear bearings 74 mounted along opposite edges thereof for connection to guide rails 76 mounted at a steep angle in the pit 32. A driver, such as a servomotor driven ball screw 80, is mounted in the pit and is driven by a servomotor 82 for raising and lowering the carrier 72 by engagement with a ball nut 84 attached to the carrier 72.

The headers 70 may be individually mounted on the carriers 72, one header 70 for each carrier. In this arrangement, the guide rails 76 would be set at an angle selected to provide movement of the headers 70 in a direction having a vertical component and a horizontal component so as to move downwardly into said pit and horizontally away from the wing panel when the elevator driver operates the elevator to move the header 70 down and away from the wing panel to clear the yoke 30 for movement past the header 70. The angle is slightly greater than the vertical angle Θ of the tangent to the wing panel P at its maximum deviation from vertical.

In another form, the carriers 72 would carry a frame on which the headers 70 would be mounted individually by swing arms that would allow the headers 70 to swing away from the panel and down into the pit to clear the way for the yoke 30 to move into and through the space otherwise occupied by that header 70.

To provide the capability to fixture wing panels of other configurations, additional headers 70 may be interleaved among the headers 70 in current use. These other headers would remain in the retracted position in the pit until required to fixture another panel shape. Up to six sets of headers 70 for different wing panel configurations could be accommodated. Additional flexibility, as might be required to change over to a new model product, may be accomplished by removing a set of headers 70 from the fixture and replacing them with new headers.

A stringer positioning device 88 is mounted alongside one longitudinal edge of the pit 32 for positioning a stringer S loaded thereon against the assembled wing planks on the fixture 34 accurately in accordance with the wing design. The stringer positioning device 88 includes a series of stands 90 arranged in a row alongside the pit 32 and a gripper device 92 mounted on the ends of extension arms 94 at the ends of linear actuators 96 connected to the stands 90. The stringer S is clamped to the gripper device 92 by swivels which enable the stringer to be tilted slightly to lie flat against the wing panel P regardless of the chordwise position of the stringer S on the panel P, since the tangent of the curve described by the wing panel in the chordwise direction will be different at different positions around the chord of the wing panel P.

After the stringer S is loaded into the grippers by the machine vigil attendant MVA, the actuators 96 are energized to push the stringer S towards the panel P to achieve a firm contact of the contact surface of the stringer S along the length of the stringer S.

The tools 42 and 44 on the ends of the yoke arms 38 and 40 can include existing tools and processes used on conventional fastener installation equipment. Operations contemplated for this wing panel assembly cell include clamp-up of the stringer and the wing panel plank at the fastener location, hole drilling and hole preparation such as coldworking, reaming, countersinking and hole inspection. Installation of fasteners such as rivets, bolts, and/or lock bolts can be done with automatic fastener insertion tools. The inserted fasteners, in the case of rivets, can be secured by a hydraulic rivet squeezer or electromagnetic rivet impact apparatus, and in the case bolts and lockbolts, with nut or collar installation apparatus. One device that could be adapted for use with this invention is the "Drill/Rivet Device" shown in U.S. Pat. No. 5,231,747. An advanced tooling system that could be adapted for use with this invention is shown in U.S. Patent Application Ser. No. 08/237,435 by Buttrick et al. entitled "Turret Head Fastener Installation".

Because this invention is intended to be used for wing panel assembly on up to six different wing panel designs, and even more different designs with exchange of sets of headers 70, a quick release mechanism 98 is provided on the yoke arms 38 and 40 to enable the tooling sets 42 and 44 to be quickly removed and replaced with different sets of fastening tools. This simplifies the tool design since one tooling set is not needed to perform the fastener installation for all types of fasteners. The quick release mechanism 98 also reduces down time of the machine for maintenance and repair by the use of duplicate tooling which can be used while the first set of tooling is being serviced.

Figure 5:
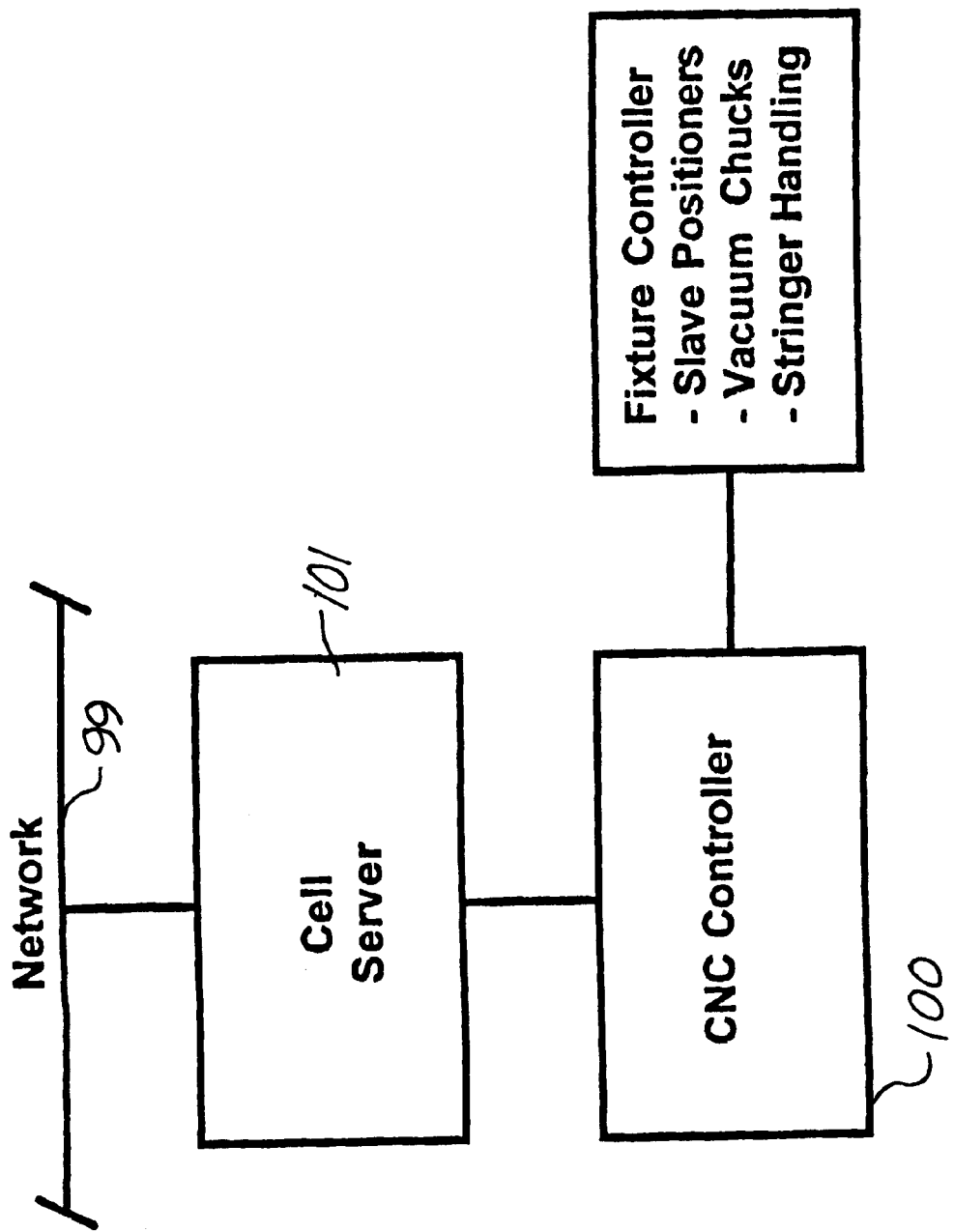
FIG. 5 is a schematic diagram of a control architecture for controlling the elevators and the fixture, the saddle mechanism for moving the yoke longitudinally along the pit, and the tools on the yoke.

In operation, the factory receives an order for one or more wing panels of a certain design. As shown in FIG. 5, the design of that wing panel is downloaded via a network 99 from a digital database of an engineering authority for the product to a server 101 and thence to a machine tool controller 100 for controlling the operations of apparatus and the tools. It is contemplated that this invention will use the concepts of determinant assembly taught in U.S. Pat. No. 5,560,102 by Micale and Strand entitled "Panel and Fuselage Assembly" and in Provisional Application Ser. No. 60/013,986 by Munk, Strand and Nelson entitled "Determinant Wing Assembly", the disclosures of which are incorporated herein by reference. The wing panel planks are indexed onto the headers 70 using accurately drilled locating holes and index pins on the headers. After the planks are loaded onto the headers 70, the controller 100 executes a probe routine that directs the machine to move a probe held by the tooling 42 to probe for coordination features such as coordination holes, tool balls mounted in coordination holes or accurately machined notches or the like along edges of the wing planks. The probing routine locates the actual position of the wing panel planks on the headers 70 with a high degree of accuracy. The part program for the wing panel product is normalized with the actual position of the wing panel planks of the headers so that the part program now coincides exactly with the actual position of the planks on the headers 70.

The controller 100 now energizes the elevator servomotors 82 to move the fixture 34 to the correct elevation for attachment of the first stringer S and cues the attendant MVA to load the first stringer onto the stringer positioning device 88. Normally, the attendant will have already loaded a stringer onto the stringer positioning device 88, so he now energizes the actuators 96 to push the stringer S into position against the panel P. When the stringer is in position, the controller 100 executes another probe routine to locate the actual position of the stringer S against the panel P, and normalizes the part program with the actual position coordinates.

The controller 100 energizes the drive mechanism 56 to drive the saddle 52 to position the yoke 30 at the location of the first fastener. The servomotor 64 tilts the yoke 30 to normalize the line of action of the tools 42 and 44 to the tangent of the panel curve at the point of fastener installation. The elevation of the panel by the elevator 33 accounted for the change in elevation of the tools when the yoke tilted to the correct angle, so no correction is needed. However, any correction in elevation of the tools that may be needed for any reason can be accomplished by operating the jack 55 to raise or lower the support structure 46 by the desired increment. The hardware and software are now configured to commence fastening the stringer S to the panel.

The fastening routine in the machine controller 100 is now executed to cause the tools to clamp up the stringer against the panel plank, drill the fastener hole, condition the hole, insert the fastener and secure the fastener. The tooling then unclamps and the controller directs the drive mechanism 56 to drive the saddle 52 to position the yoke 30 at the location of the next fastener where the fastener installation operations are repeated. No adjustment will normally be required in the vertical direction since the stringer is positioned parallel to the track 54 (normally horizontally) so the tools 42 and 44 remain opposed at the stringer level throughout the entire range of travel of the yoke 30 from one end of the panel P to the other end.

When the fastener installation has proceeded to the point that the yoke 30 draws close to a header 70, the controller 100 operates a valve in the vacuum line to the suction cups on the header to release the header 70 from the panel, and the elevator 70 is withdrawn from the panel P and retracted into the pit to give access to the fastener positions covered by the header and to clear the space for the tooling to pass the position of the header 70. The remaining headers 70 still connected to the panel P are more than adequate to hold it rigidly in position for the fastening operations in the vicinity of the retracted header 70.

The mass of the yoke 30 and the attached tooling 42 and 44 will normally tend to cause a certain amount of oscillation when the drive mechanism 56 starts and stops the saddle 52 to position the yoke at each hole location in order. Fastener installation operations must normally wait until the oscillations have damped to a certain maximum amplitude which can affect cycle time, that is, the average time to complete the installation of a single fastener and move to the next position. Because cycle time is an important factor in assessing machine efficiency, oscillations of this nature are considered undesirable and to be minimized. Accordingly, when moving the machine from one fastener location to the next, the controller 100 is programmed to swing the support structure and yoke 30 about the "B" axis in the direction of movement of the saddle 52 along the track 54, and then swing it back again as the saddle 52 reaches its designated position for the next fastener location. This routine reduces the oscillation amplitude to the extent that fastener installation operations can commence immediately and cycle time is significantly improved.

Figure 2:
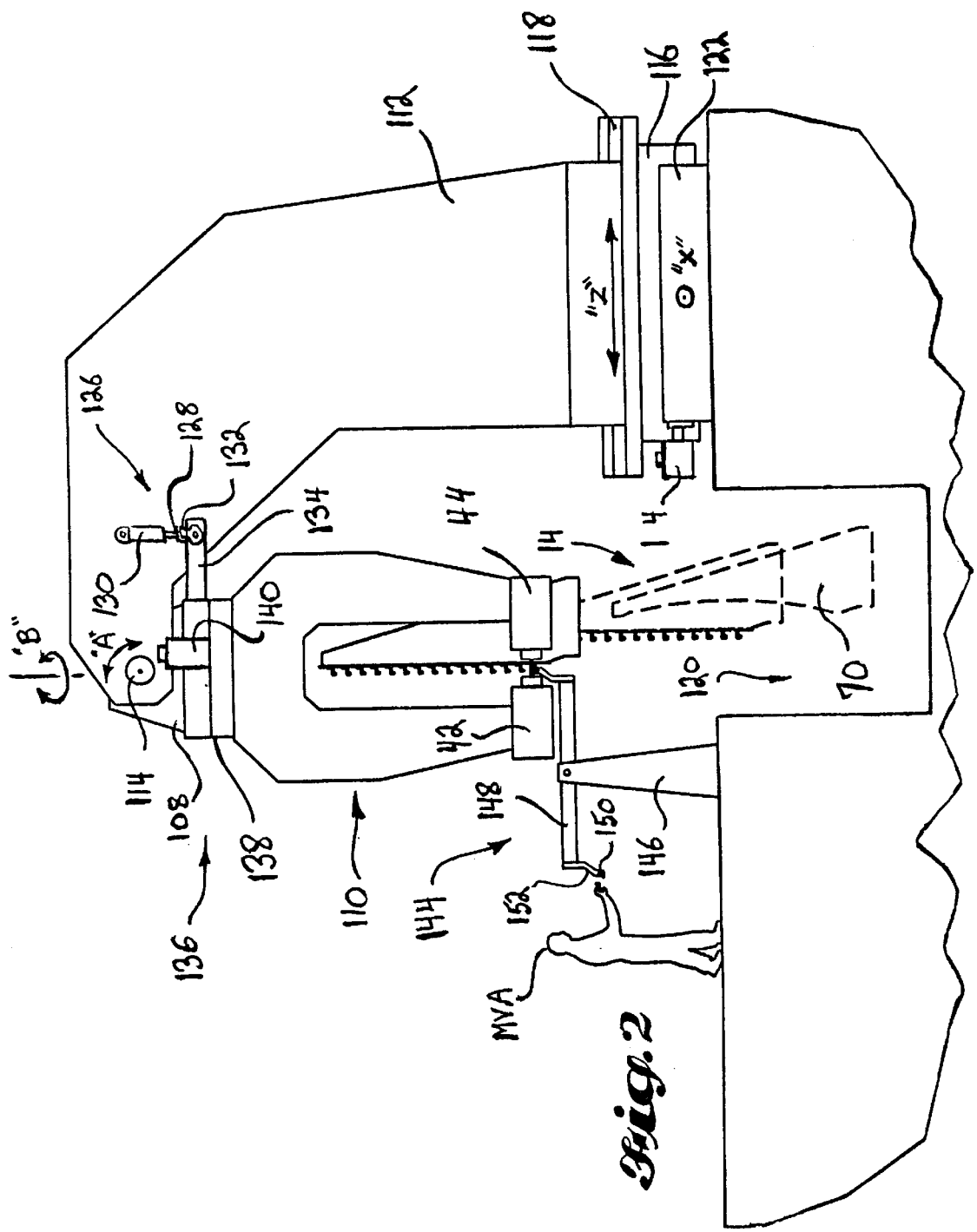
FIG. 2 is a sectional elevation of a second embodiment of an apparatus for practicing the method of this invention.

Turning now to FIG. 2, a second embodiment of the invention is shown having a yoke 110 suspended on a yoke mount 108 from a support structure 112 by a pivot 114 which allows the yoke to rotate about a horizontal "A" axis, coincident with the axis of the pivot 114. The support structure 112 is mounted on a saddle 116 by way of a linear slide mechanism 118 that allows the support structure to move laterally toward and away from an elongated pit 120, like the pit 32 in the first embodiment. The saddle 116 is mounted on a track 122 that extends along one longitudinal edge of the pit 120 in the "X" direction, parallel to the "A" axis. A driver 124 is provided for driving the saddle 116 along the track 122, as in the embodiment of FIG. 1.

A tilt control mechanism 126 is attached between the support structure 112 and the yoke mount 108 for tilting the yoke 110 to a desired angle about the "A" axis. The tilt control mechanism 126 shown has a ball screw 128 driven by a servomotor 130 pivotally attached to the support structure 112. The ball screw is engaged with a ball nut 132 pivotally attached to an arm 134 extending from the yoke mount 108. Operation of the servomotor 13 in one direction or the other extends or retracts the ball screw 128 in the ball nut 132 and rocks the arm 134 and the attached yoke mount 108 about the pivot 114 to rotate the yoke a controlled angular displacement about the "A" axis.

The yoke mount 108 includes a rotational joint 136 providing controlled rotation of the yoke 110 about a vertical "B" axis. The rotational joint 136 includes a ring gear 138 and a pinion gear driven by a servomotor 140. An optical scale can be attached to the ring gear for positional feedback to confirm the normal feedback from the servomotor to provide independent data to the controller 100 regarding the angular position of the yoke 110 about the "B" axis.

The pit 120 contains an elevator (not shown) for providing elevation control of a fixture 142, shown schematically as a header 70 in broken lines in the retracted position, and shown in solid lines in two working positions at the upper and lower extremes of the working positions. The pit and non-illustrated elevator are shown schematically because they are identical to the pit 32 and elevator 33 shown and described for the embodiment of FIG. 1.

A stringer positioning device 144 is mounted along the opposite longitudinal edge of the pit 120 from the track 122. It includes a series of stanchions 146 arranged in a straight line and a bar 148 pivotally mounted on each stanchion 146. The bars 148 are provided with two detents that selectively index the bars 148 at either of two horizontal positions, 180° apart. A stringer gripper 150 is mounted on the end of an extension arm 152, in turn attached to a linear actuator 154 mounted in each end of the bars 148. The double ended stringer positioning device 144 enables the attendant MVA to load a stringer S onto the grippers 150 at one end of the bars 148 while a stringer is held against the panel P by the grippers 150 at the other end of the bars 148 during fastener installation operations by the machine.

Operation of the machine shown in FIG. 2 is the same as the operation of the embodiment of FIG. 1, with the exception that tilting the yoke 110 about the "A" axis and rotation of the yoke 110 about the "B" axis does not result in significant displacement of the line of action of the tools 42 and 44. Operation to minimize oscillation of the yoke during movement of the machine along the "X" axis between fastener locations involves over-travel beyond the new fastener location and then a slight backward movement in the "X" direction to nullify the momentum imparted into the yoke during initial movement toward the new fastener location.

Figure 3:
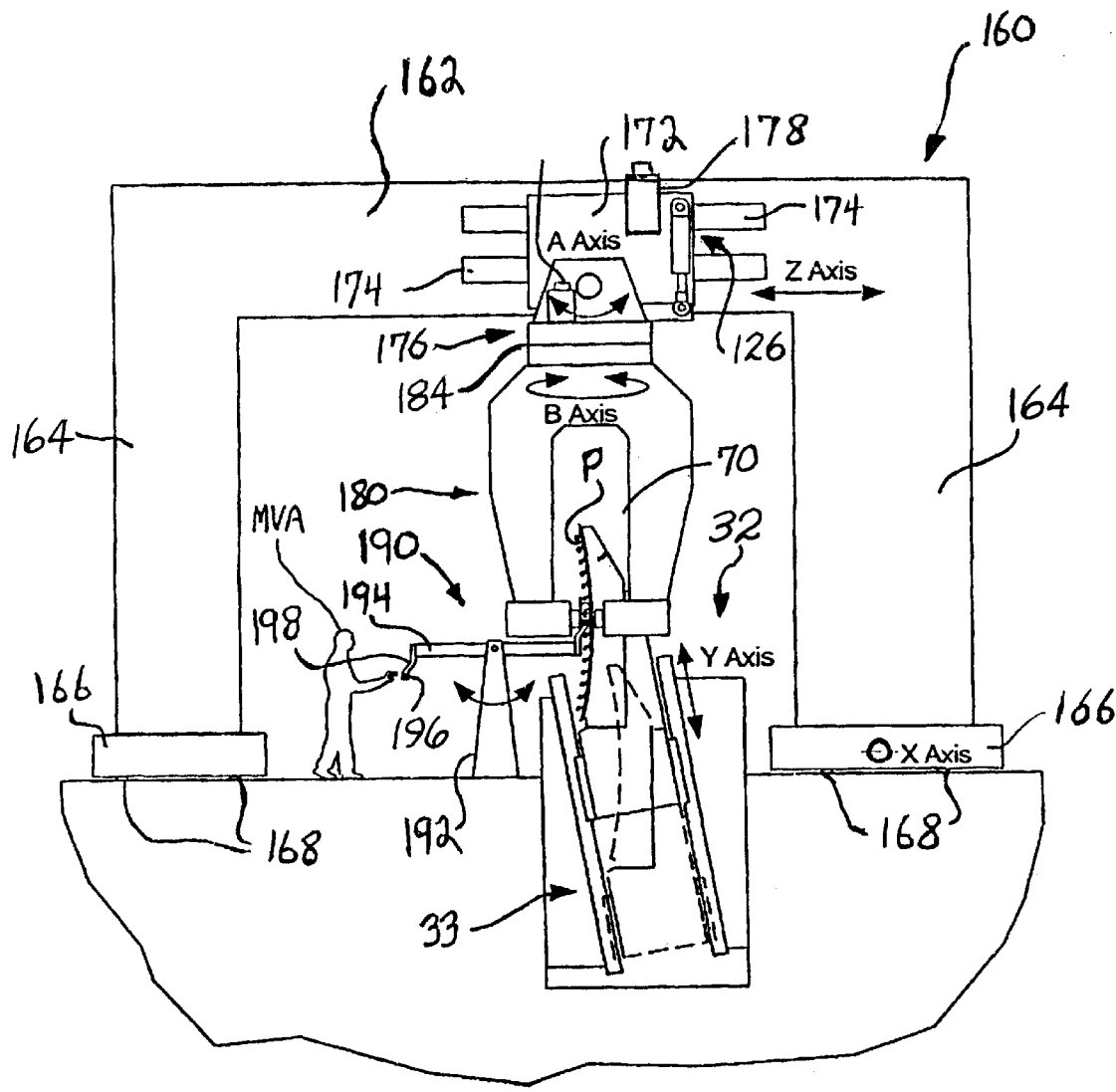
FIG. 3 is an end elevation of a third embodiment of an apparatus for practicing the method of this invention.

As shown in FIG. 3, a third embodiment of the invention includes a support structure in the form of a gantry apparatus 160 having a top cross member 162 supported on two upright supports 164, each support carried by a saddle 166 mounted on rails 168 for linear motion in an "X" direction longitudinally of an elongated pit 32 spanned by the gantry 160. A carrier 172 is mounted on the top cross member 162 on two parallel rails 174 mounted thereon and supports a yoke orienting system including a yoke mount 176 like the yoke mount 108 in FIG. 2. A driver 178 is attached to the carrier 172 for driving the carrier 172 along the rails 174 laterally of the pit 32. The driver 178 includes a servomotor operated by the controller 100 for driving a pinion gear engaged with a gear rack on one of the rails 174 to move the carrier 172 in the "Z" direction to a selected position on the cross member 162 over the pit 32.

A yoke 180 is hung from the yoke mount 176 for orienting the yoke 180 to positions that will orient the line of action of the tools 42 and 44 normal to the curvature of the panel P at any designated fastener location. The yoke mount 176 has the capability of rotation about a vertical "B" axis and for tilting about a horizontal "A" axis parallel to the "X" axis. Controlled rotation about the "B" axis under control of the controller 100 is effected by a servomotor 182 driving a pinion gear engaged with a ring gear 184 on the mount 176 as in the embodiment of FIG. 2. Tilting of the yoke mount 176 and the yoke 180 is effected by a tilt control mechanism 184 whose structure and operation is the same as the tilt control mechanism 126 of the embodiment shown in FIG. 2, so the description of that mechanism will not be repeated here.

A stringer positioning mechanism 190 for positioning stringers at desired positions against the wing panel P includes a series of upright stanchions 192 mounted on a straight row alongside one longitudinal edge of the elongated pit 170, and a series of bars 194 pivotally supported at the tops of the stanchions 192. The bars 194 have stringer grippers 196 at the ends of extension bars 198 mounted at the extreme ends of the bars 194 for securely gripping a stringer S and orienting it accurately at the designated position against the panel P. A linear actuator in the bars 194 can be energized to press the stringer mounted in the grippers against the panel, holding it firmly against the panel P.

The planks that make up the panel P are loaded onto headers 70 of a fixture supported on an elevator 33, as in the embodiment shown in FIG. 1. The panel planks are oriented on the headers 70 such that the locations at which the stringers are to be attached are horizontal. The stringer positioning mechanism 190 holds the stringer horizontally at a precisely known elevation, and the elevator 33 lifts the headers 70 under control of the controller 100 to position the panel planks for the panel P at the correct elevation relative to the stringer positioning mechanism 190 so that the stringer is placed exactly where it belongs on the panel P in accordance with the design of the wing panel that was downloaded via the network 99 from the engineering digital database and converted into a part program for the controller 100 for controlling the operations of elevator 33, the drivers on the support structure and yoke orienting system, and the tools 42 and 44.

The stringer positioning mechanism 190 has a stringer gripper 196 at each end so that a stringer can be loaded onto the gripper at one end while the stringer positioning mechanism 190 is holding a stringer at the other end while the tools 42 and 44 are attaching it to the panel P. The bars 194 are provided with detents at their connection to the stanchions 192 to index the bars selectively at an exactly horizontal orientation at either of two positions 180° apart.

The operation of the embodiment shown in FIG. 3 is the same as the operation described for the embodiment of FIG. 1, so it will not be repeated here.

Figure 4:
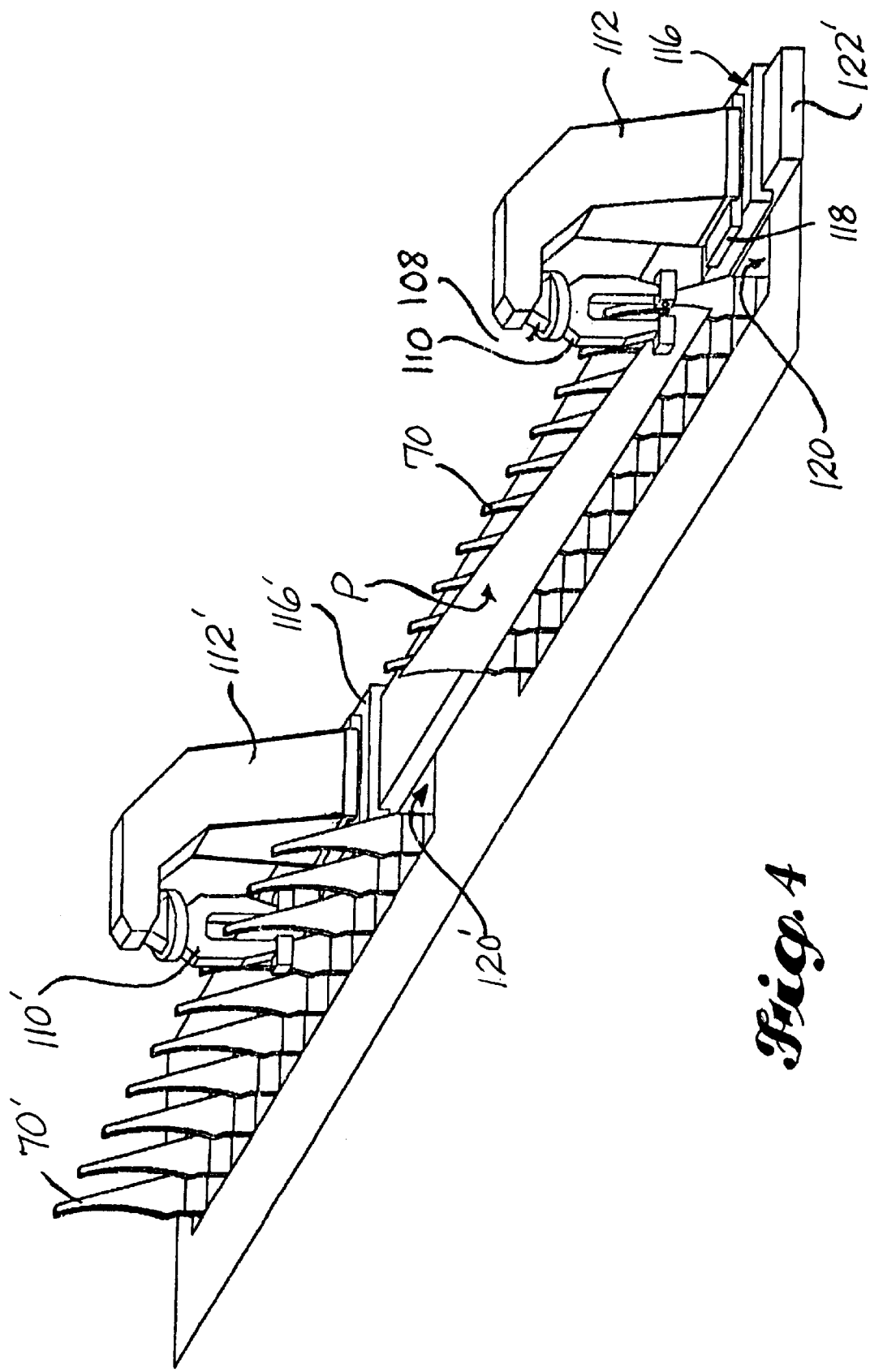
FIG. 4 is a perspective view of the yoke assembly embodiment shown in FIG. 2, but with two yoke assemblies over a wing panel pit long enough to accept two wing panels supported end-to-end.

A tandem arrangement of the invention is shown in FIG. 4 using the type of support structure shown in FIG. 2. Two separate elongated pits 120 and 120' are shown, although a single pit of the equivalent length could be used. Two support structures 112 and 112' are mounted on saddles 116 and 116' on an elongated rail 122' for linear movement longitudinally of the pits 120 and 120'. Yokes 110 and 110' are supported on the support structures 112 and 112' in the same manner as described for the embodiment of FIG. 2. The operation of each support structure and yoke is the same as that described for FIG. 2.

The tandem arrangement shown in FIG. 4 provides a production capacity that is more than twice the capacity of a single yoke apparatus because the panel P mounted on the set of headers 70 can be operated upon by two yokes 110 and 110' while planks are loaded onto the headers 70' or while the fixture or elevator in either pit is being serviced or changed, thereby eliminating idle time for either yoke system.

Figure 6:
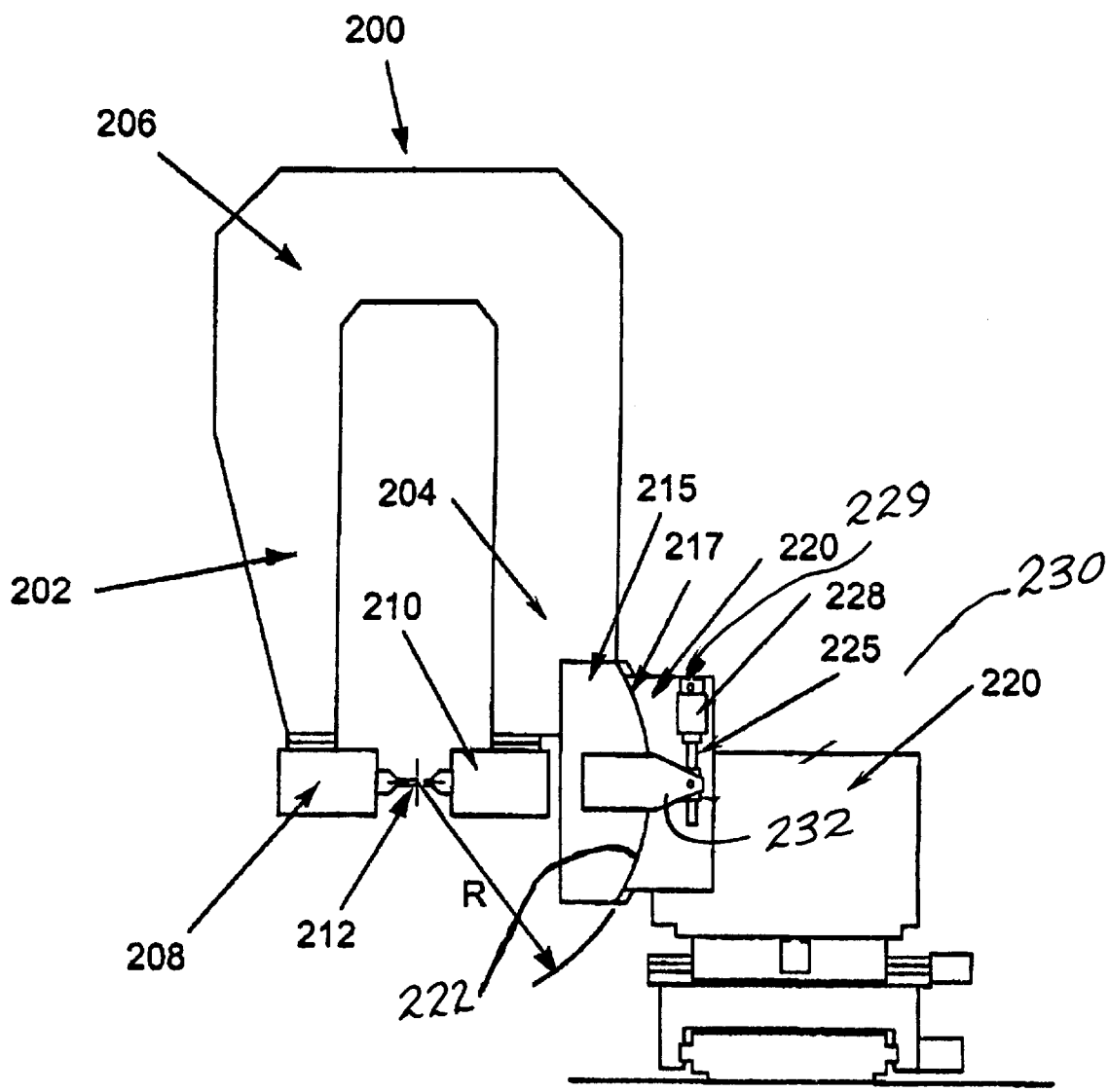
FIG. 6 is an end elevation of a fourth embodiment of an apparatus for practicing the method of this invention.

Turning now to FIG. 6, a yoke 200 includes two legs 202 and 204 depending from an upper cross member 206. Each arm 202 and 204 has a set of tools 208 and 210 attached by a connector mechanism, that may provide quick change capability for easy detachment and replacement for tool maintenance and change of tools for different wing designs and sizes. The tool sets 208 and 210 operate on the wing panel at a tool point 212 approximately midway between them.

The yoke arm 204 has a curved abutment 215 on its outer surface 217 that has a cylindrical convex curve with a radius of curvature equal to the distance R from the surface 217 to the tool point 212. The yoke is supported on a support member 220 having a cylindrical concave surface 222 also having the same radius of curvature R. A pair of curved tracks (not shown) is mounted on the concave surface 222 of the support member 220, and a pair of linear bearings (not shown) is mounted on the convex curved surface 217 of the yoke arm abutment 215, engaged with the tracks on the surface 222. Curved track linear bearings of this type are known generically as "goniometric bearings" and are commercially available, for example, from THK designated as R Guide Type HCR.

Since the yoke 200 swivels about the tool point 212, there is no change in the vertical position of the tool point when the yoke tilts, as there is in the embodiments of FIGS. 1, 2 and 3 when the yoke tilts. Therefore, there is no need to provide vertical adjustment capability to accomodate a change in the vertical position of the tool point as the yoke tilts. However, if a small vertical adjustment capability is desired, it can be provided with a small jack in the support member 220 or the elevator mechanism 33 can be provided with a fine adjustment for micro-adjustament of the vertical position of the wing panel on the fixture 34 in the pit 32.

Adjustment of the tilt angle of the yoke 200 is effected by an adjustment mechanism including a ball screw 225 driven by a servomotor 228 pivotally connected to the support structure 220 at a pivot 229. A ball nut 230 is engaged with the ball screw 225 and is pivotally connected to an arm 232 attached to the curved abutment 215. Operation of the servomotor 228 in either direction causes the ball nut 230 to translate linearly along the ball screw 225 and the arm 232 to tilt and rotate the curved abutment 215 on the curved tracks The yoke 200 and the support member 220 are supported alongside the pit 32 in the same manner as the embodiments of FIGS. 1 and 2, and their operation is the same as those embodiments except that there is no need to adjust the vertical position of the tool point 212 when the tilt angle of the yoke is changed to accomodate the curvature of the wing pane. Therefore, there is not need to repeat the description of their structure and operation.

The wing panel assembly method and apparatus described above can be used advantageously to fasten stiffening stringers to wing planks that are to be assembled as full wing panels on another larger machine. This efficiently makes use of a small machine to do most of the work and makes possible the purchase of fewer large (and expensive) machines to do the splice stringer fastening which requires a greater span in the case of large airplane wing panels.

Obviously, numerous modifications and variations of the preferred embodiments described above are possible and will occur to those skilled in the art in light of this specification. Accordingly, it is expressly to be understood that these variations and modification, and the equivalents thereof, are to be considered within the spirit and scope of this invention, as defined in the following claims, wherein I claim:

What is claimed is:

1. A process of fabricating wing panels for airplane wings at a desired chordwise curvature and spanwise curvature according to a wing design. said wing panels having a plurality of elongated wing planks attached together and stiffened with stringers parallel to each other, said method comprising:

assembling said planks on a first set of headers of a fixture and holding said planks as assembled on said fixture at said desired curvature;

supporting said fixture on an elevator in an elongated pit for precise adjustment of said fixture and said assembled wing planks in a generally vertical direction;

positioning a stringer against said assembled wing planks accurately in accordance with said wing design;

suspending a downwardly opening yoke over said pit on a support structure and operating tools mounted on opposite arms of said yoke for performing clamp-up, drilling and fastener installation functions with said tools to fasten said stringer to said assembled wing panel planks on said fixture;

moving said support structure along horizontal rails longitudinally of said pit along a "X" axis to position said yoke and said tools mounted thereon sequentially at fastener positions spaced along said stringer; and moving said elevator in a generally vertical direction to position said assembled wing panel planks at a desired elevation corresponding to a next stringer to be attached to said wing planks.

2. A process of fabricating as defined in claim 1, wherein:

said stringer positioning step includes loading a first stringer on a stringer positioning device and operating said stringer positioning device to transfer said first stringer against said assembled wing planks at a position specified by said wing design within specified tolerances in said wing design.

3. A process of fabricating as defined in claim 2, further comprising:

loading another stringer onto an opposite side of said stringer positioning device while said stringer positioning device is holding said first stringer against said panel;

whereby said other stringer may be moved into position against said wing planks immediately after said first stringer has been fastened to said wing planks.

4. A process of fabricating as defined in claim 1, further comprising:

detaching said headers from said wing plank assembly one at a time and lowering said detached headers into said pit to clear said yoke and said tools thereon as said yoke approaches said headers.

5. A process of fabricating as defined in claim 1, further comprising:

said supporting of said fixture includes supporting said headers on carriers and guiding said carriers on rails in said pit for movement in said generally vertical direction; and said moving of said elevator in a generally vertical direction includes operating a driver under control of a controller to position said carrier at an elevation that positions said assembled wing panel planks at said desired elevation.

6. A process of fabricating as defined in claim 1, further comprising:

retracting said headers individually away from said panel planks to provide access to fastener locations covered by said headers.

7. A process of fabricating as defined in claim 1, further comprising:

tilting said yoke about an "A" axis parallel to said "X" axis to normalize a line of action of said tools with a tangent of said chordwise curvature at a desired fastener location.

8. A process of fabricating as defined in claim 1, further comprising:

rotating said yoke about a vertical "B" axis to normalize a line of action of said tools with a tangent of said spanwise curvature at a desired fastener location.

9. A process of fabricating as defined in claim 1, further comprising:

retracting all of said headers in said first set into said pit and elevating out of said pit a second set of headers having a second spanwise curvature and chordwise curvature for a second wing panel design;

assembling a second set of wing panel planks of said second wing panel design on said second set of headers and holding said second set of planks as assembled on said fixture at said second spanwise curvature and chordwise curvature;

supporting said second set of headers on said elevator in said pit for precise adjustment of said second set of headers and said second set of wing planks in a generally vertical direction;

positioning a stringer against said second set of wing planks accurately in accordance with said second wing design;

suspending said yoke over said pit on said support structure and operating said tools mounted on opposite arms of said yoke for performing clamp-up, drilling and fastener installation functions with said tools to fasten said stringer to said second set of wing panel planks on said second set of headers;

moving said support structure longitudinally of said pit along said "X" axis to position said yoke and said tools mounted thereon sequentially at fastener positions spaced along said stringer; and moving said elevator in a generally vertical direction to position said second set of wing panel planks at a desired elevation corresponding to a next stringer to be attached to said second set of wing planks.

10. A process of fabricating as defined in claim 1, further comprising:

nullifying oscillation of said yoke in moving from one fastener location to the next by moving said yoke partially beyond said new fastener location and then reversing motion to move said yoke to said new fastener location.

11. A process of fabricating a stiffened wing panel component in accordance with a desired curvature defined in a design for a jet transport airplane, said stiffened wing panel component including a wing panel plank to which is fastened stiffening stringers an a parallel array extending longitudinally along said plank, said process comprising:

indexing said plank on a plurality of headers at index locations and against reference surfaces of said headers having said desired curvature;

supporting said headers on an elevator in an elongated pit for precise adjustment in a generally vertical direction;

positioning a stringer against said wing panel plank accurately in accordance with said design;

supporting a downwardly opening yoke on a support structure over an elongated pit, said yoke having two arms depending from a top member, said support structure having linear mobility in a "Z" direction laterally of said pit and in an "X" direction longitudinally of said pit, and also having rotational mobility about a vertical "B" axis and about an "A" axis parallel to said "X" axis;

performing clamp-up, drilling and fastener installation functions tools mounted on opposite arms of said yoke to fasten said stringer to said wing panel plank on said headers; and generating signals in a control system and conducting said signals to an elevator actuator for moving said headers in a generally vertical direction to position said wing panel plank at an elevation corresponding to a next stringer to be attached to said wing plank.

12. A process of fabricating a stiffened wing panel component in accordance with a desired curvature, said stiffened wing panel component including an elongated wing panel plank to which is fastened an array of longitudinally extending stiffening stringers [an array extending longitudinally] along said plank, said process comprising:

mounting said plank on a plurality of headers at index locations and against reference surfaces of said headers having said desired curvature;

moving said headers in an elongated pit to a precise vertical position for convenient access to said plank;

positioning a stringer against said wing panel plank accurately at a desired position;

supporting tools for clamp-up, drilling and fastener installation on spaced arms of a downwardly opening yoke;

suspending said yoke on a support structure over said elongated pit with said arms on opposite sides of said plank, said support structure having linear mobility in a "Z" direction laterally of said pit and in an "X" direction longitudinally of said pit, and also having rotational mobility about a vertical "B" axis and about an "A" axis parallel to said "X" axis;

performing clamp-up, drilling and fastener installation functions with said tools mounted on said arms of said yoke to fasten said stringer to said wing panel plank on said headers; and generating signals in a control system and conducting said signals to an elevator actuator for moving said headers in a generally vertical direction to position said wing panel plank at an elevation corresponding to a next stringer to be attached to said wing plank.

13. A process of fabricating a stiffened wing panel component as defined in claim 12, wherein:

said stringer positioning step includes loading a first stringer on a stringer positioning device and operating said stringer positioning device to transfer said first stringer against said wing plank at a position specified by said wing design within specified tolerances in said wing design.

14. A process of fabricating a stiffened wing panel component as defined in claim 12, further comprising:

detaching said headers individually from said wing plank assembly serially and lowering said detached headers into said pit to clear said yoke and said tools thereon as said yoke approaches said headers.

15. A process of fabricating a stiffened wing panel component as defined in claim 12, further comprising:

tilting said yoke about said "A" axis to normalize a line of action of said tools with a tangent of said desired curvature at a desired fastener location.

16. A process of fabricating a stiffened wing panel component as defined in claim 12, further comprising:

rotating said yoke about said "B" axis to normalize a line of action of said tools with a tangent of said desired curvature at a desired fastener location.

17. A process of fabricating wing panels for airplane wings in accordance with a first wing design at a desired chordwise curvature and spanwise curvature, said wing panels having a plurality of elongated wing planks attached together and stiffened with stringers, said method comprising:

assembling said planks on a first set of headers of a fixture and holding said planks as assembled on said fixture at said desired curvature;

supporting said fixture on an elevator in an elongated pit for precise adjustment of said fixture and said assembled wing planks in a generally vertical direction;

positioning a stringer against said assembled wing planks accurately in accordance with said wing design;

suspending a downwardly opening yoke over said pit on a support structure and operating tools mounted on opposite arms of said yoke for performing clamp-up, drilling and fastener installation functions with said tools to fasten said stringer to said assembled wing panel planks on said fixture;

moving said support structure along horizontal rails longitudinally of said pit along a "X" axis to position said yoke and said tools mounted thereon sequentially at fastener positions spaced along said stringer; and moving said elevator in a generally vertical direction to position said assembled wing panel planks at a desired elevation corresponding to a next stringer to be attached to said wing planks.

18. A process of fabricating as defined in claim 17, further comprising:

detaching said headers individually from said wing plank assembly sequentially and lowering said detached headers into said pit to clear said yoke and said tools thereon as said yoke approaches said headers.

19. A process of fabricating as defined in claim 17, further comprising:

retracting said headers individually away from said panel planks to provide access to fastener locations covered by said headers.

20. A process of fabricating as defined in claim 17, further comprising:

tilting said yoke about an "A" axis parallel to said "X" axis to normalize a line of action of said tools with a tangent of said chordwise curvature at a desired fastener location; and rotating said yoke about a vertical "B" axis to normalize a line of action of said tools with a tangent of said spanwise curvature at a desired fastener location.

* * * * *